(12) United States Patent
Mohanty et al.

(10) Patent No.: US 9,438,560 B2
(45) Date of Patent: Sep. 6, 2016

(54) SYSTEMS AND METHODS FOR AUTOMATICALLY APPLYING FIREWALL POLICIES WITHIN DATA CENTER APPLICATIONS

(71) Applicant: Symantec Corporation, Mountain View, CA (US)

(72) Inventors: Shubhabrata Mohanty, Magarpatta (IN); Amaresh Shirsat, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/588,146

(22) Filed: Dec. 31, 2014

(65) Prior Publication Data

US 2016/0191463 A1  Jun. 30, 2016

(51) Int. Cl.
*H04L 29/06* (2006.01)
*H04L 12/24* (2006.01)

(52) U.S. Cl.
CPC .......... *H04L 63/02* (2013.01); *H04L 41/0803* (2013.01)

(58) Field of Classification Search
CPC .................................................. H04L 41/0803
See application file for complete search history.

(56) References Cited

U.S. PATENT DOCUMENTS

| | | | | |
|---|---|---|---|---|
| 7,383,568 B1* | 6/2008 | Newstadt | ............ | H04L 63/0263 726/1 |
| 7,904,595 B2* | 3/2011 | Cheng | ................ | G06F 17/3089 704/8 |
| 8,516,059 B1* | 8/2013 | Singh | ..................... | G06F 15/16 709/204 |
| 8,578,017 B2* | 11/2013 | Cobb | ................. | H04L 12/2602 709/203 |
| 8,850,558 B2* | 9/2014 | Ong | ....................... | G06F 21/34 726/18 |
| 2002/0128984 A1* | 9/2002 | Mehta | .................. | G06F 21/125 705/71 |
| 2006/0041445 A1* | 2/2006 | Aaron | ..................... | G09B 7/00 706/47 |
| 2006/0080657 A1* | 4/2006 | Goodman | ............. | G06F 9/5061 717/177 |
| 2006/0161582 A1* | 7/2006 | Aghajanyan | ............. | G06F 9/50 |
| 2009/0276771 A1* | 11/2009 | Nickolov | .............. | G06F 9/4856 717/177 |
| 2010/0185666 A1* | 7/2010 | Crow | ................ | G06F 17/30864 707/770 |
| 2010/0333165 A1 | 12/2010 | Basak et al. | | |
| 2013/0019277 A1 | 1/2013 | Chang et al. | | |
| 2013/0097662 A1* | 4/2013 | Pearcy | .................. | G06F 21/577 726/1 |
| 2013/0246430 A1* | 9/2013 | Szucs | ................ | G06F 17/30011 707/738 |

(Continued)

OTHER PUBLICATIONS

Deb Banerjee; Systems and Methods for Automatically Encrypting Sensitive Data in Accordance with Security Policy Rules; U.S. Appl. No. 14/548,268, filed Nov. 19, 2014.

(Continued)

*Primary Examiner* — Izunna Okeke
*Assistant Examiner* — Ali Shayanfar
(74) *Attorney, Agent, or Firm* — ALG Intellectual Property, LLC

(57) ABSTRACT

The disclosed method may include (1) identifying a data center application whose functionality is provided by a set of systems, (2) organizing, automatically by the computing device, the set of systems into one or more application model groups by, for each system in the set of systems, identifying an attribute of the system that is indicative of a security context under which the system should operate and assigning the system to an application model group for which the security context will be provided, and (3) for each application model group in the one or more application model groups, protecting the application model group by selecting a firewall configuration that will provide the security context for the application model group and by using the selected firewall configuration to protect the application model group. Various other methods, systems, and computer-readable media are also disclosed.

20 Claims, 9 Drawing Sheets

(56) References Cited

U.S. PATENT DOCUMENTS

| | | | |
|---|---|---|---|
| 2013/0276053 A1 | 10/2013 | Hugard, IV et al. | |
| 2014/0156851 A1* | 6/2014 | Suami | G06F 9/45558 709/226 |
| 2014/0181892 A1* | 6/2014 | Von Bokern | H04L 63/102 726/1 |
| 2014/0359749 A1 | 12/2014 | Rieke et al. | |
| 2015/0326532 A1* | 11/2015 | Grant | H04L 63/0218 726/1 |

OTHER PUBLICATIONS

"NetCitadel", http://www.netcitadel.com/, as accessed Nov. 6, 2014, (Jul. 19, 2003).

Hedlund, Brad, "What is a Distributed Firewall?", http://bradhedlund.com/2013/07/07/what-is-a-distributed-firewall/, as accessed Nov. 6, 2014, (Jul. 7, 2013).

"Next-Generation Firewall", https://en.wikipedia.org/wiki/Next-Generation_Firewall, as accessed Nov. 6, 2014, Wikipedia, (On or before Nov. 6, 2014).

"Symantec Data Center Security: Server, Monitoring Edition, & Server Advanced", http://www.symantec.com/data-center-security/, as accessed Nov. 6, 2014, Symantec Corporation, (Mar. 13, 2014).

"VMware NSX", http://www.vmware.com/products/nsx, as accessed Nov. 6, 2014, (Aug. 26, 2013).

"Palo Alto Networks", https://www.paloaltonetworks.com/, as accessed Nov. 6, 2014, (Oct. 18, 2000).

* cited by examiner

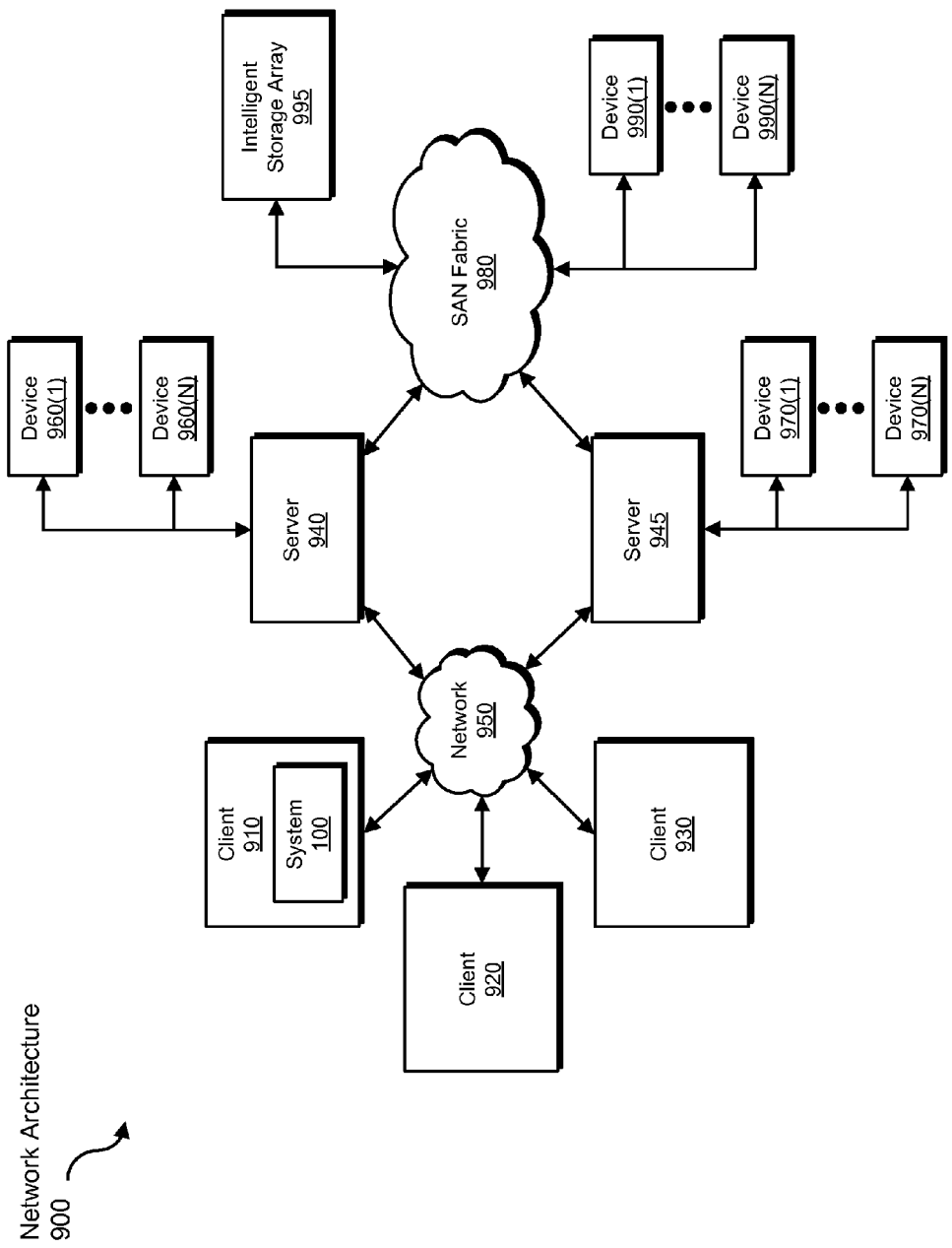

SYSTEMS AND METHODS FOR AUTOMATICALLY APPLYING FIREWALL POLICIES WITHIN DATA CENTER APPLICATIONS

BACKGROUND

Security is often described as a continuum between convenience and safety. A system that requires ten layers of security may be very difficult to attack, but it may also be so inconvenient to maintain that it may be impractical. At the opposite end, a system with no security at all is highly convenient to maintain and use but also highly insecure. Protecting networks with perimeter-only firewalls is more convenient than using more thorough defensive measures, but may also be inadequate against many increasingly prevalent forms of attack. Many data centers are becoming more and more segmented, meaning that servers and data within a single network may require many different levels of security. Providing sufficient security to segments of resources on a network may place a significant burden on Information Technology (IT) resources. Accordingly, the instant disclosure identifies and addresses a need for additional and improved systems and methods for automatically applying firewall policies within data center applications.

SUMMARY

As will be described in greater detail below, the instant disclosure describes various systems and methods for automatically applying firewall policies within data center applications by organizing systems within the data center application into application model groups that operate in similar security contexts and automatically applying the appropriate firewall policies to the systems in each application model group.

In one example, a computer-implemented method for automatically applying firewall policies within data center applications may include (1) identifying a data center application whose functionality is provided by a set of systems, (2) organizing, automatically by the computing device, the set of systems into one or more application model groups by, for each system in the set of systems, identifying an attribute of the system that is indicative of a security context under which the system should operate and assigning the system to an application model group for which the security context will be provided, and (3) for each application model group in the one or more application model groups, protecting the application model group by selecting a firewall configuration that, when applied, will provide the security context for the application model group and using the selected firewall configuration to protect the application model group.

In one embodiment, identifying the data center application may include querying a data center platform to identify the set of systems that include the data center application. In this embodiment, identifying the attribute of the system may include querying the data center application to determine an application tier that the system belongs to within the data center application, a service running on the system, an inbound dependency of the system, and/or an outbound dependency of the system.

In some examples, organizing the systems into one or more application model groups may include determining, based on application tiers, services, and dependencies of the set of systems of the data center application, how many application model groups the systems will be organized into. Organizing the systems into application model groups may also be based on the security contexts that should be provided for each of the application model groups.

In one embodiment, selecting the firewall configuration may include identifying a set of firewall configurations, where each firewall configuration within the set of firewall configurations may include a different set of firewall policies and choosing the firewall configuration that corresponds to the security context for the application model group. In this embodiment, using the selected firewall configuration to protect the application model group may include configuring a firewall with the firewall configuration and activating the firewall such that the firewall protects the application model group.

In some examples, identifying the set of firewall configurations may include identifying each application model group in which the systems of the data center application are organized and creating a firewall configuration for each identified application model group by establishing a set of firewall policies that, when enforced, will provide the security context for each identified application model group. Additionally or alternatively, identifying a set of firewall configurations may include identifying metadata of each firewall configuration in the set of firewall configurations and choosing the firewall configuration that corresponds to the security context for the application model group may include correlating the metadata of each firewall configuration in the set of firewall configurations with the one or more application model groups.

In some examples, using the selected firewall configuration to protect the application model group may include providing security micro-segmentation by enforcing one or more policies of the selected firewall configuration on communications between the application model group and at least one other application model group of the data center application. In one embodiment, the computer-implemented method may further include determining that a new system has been added to the data center application and, in response to determining that the new system has been added to the data center application, identifying an attribute of the new system that is indicative of a security context under which the new system should operate and assigning the system to an existing application model group for which the security context will be provided.

In one embodiment, the system may include a virtual machine, the firewall configuration may be implemented within a virtual firewall, and the data center application may be implemented on a software-defined data center platform. In this embodiment, organizing the set of systems into the one or more application model groups may include instructing the software-defined data center platform to use a data structure of the software-defined data center platform to divide the set of systems into the one or more application model groups.

In one embodiment, a system for implementing the above-described method may include (1) an identification module, stored in memory, that identifies a data center application whose functionality is provided by a set of systems, (2) an organization module, stored in memory, that organizes, automatically by the computing device, the set of systems into one or more application model groups by, for each system in the set of systems, identifying an attribute of the system that is indicative of a security context under which the system should operate and assigning the system to an application model group for which the security context will be provided, (3) a security module, stored in memory, that for each application model group in the one or more application model groups, protects the application model group by selecting a firewall configuration that, when applied, will provide the security context for the application model group and using the selected firewall configuration to protect the application model group, and (4) at least one physical processor configured to execute the identification module, the organization module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data center application whose functionality is provided by a set of systems, (2) organize, automatically by the computing device, the set of systems into one or more application model groups by, for each system in the set of systems, identifying an attribute of the system that is indicative of a security context under which the system should operate and assigning the system to an application model group for which the security context will be provided, and (3) for each application model group in the one or more application model groups, protect the application model group by selecting a firewall configuration that, when applied, will provide the security context for the application model group and using the selected firewall configuration to protect the application model group.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is a block diagram of an exemplary computing network capable of implementing one or more of the embodiments described and/or illustrated herein.

Figure 1:
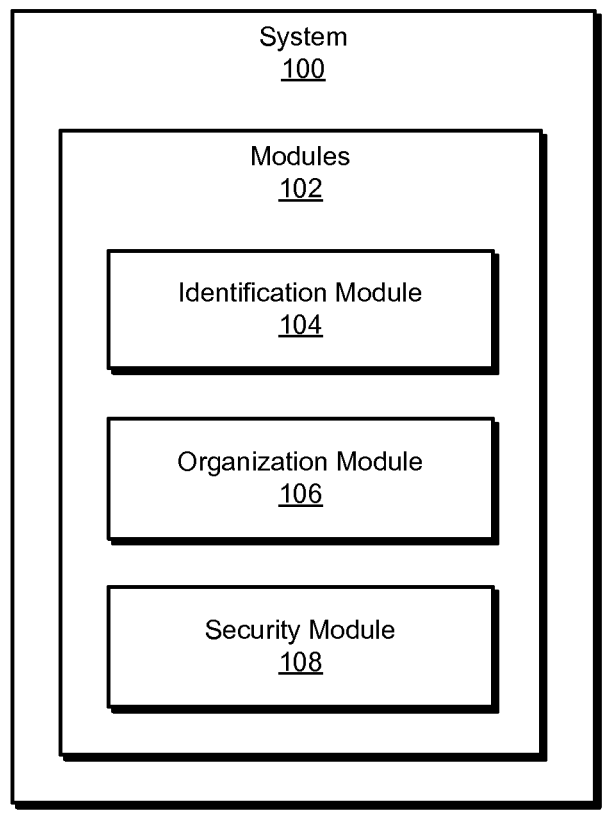
FIG. 1 is a block diagram of an exemplary system for automatically applying firewall policies within data center applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically applying firewall policies within data center applications. As will be explained in greater detail below, the systems and methods described herein may organize systems of a data center application into application model groups and then automatically apply the appropriate firewall policies to the systems of each application model group. For example, systems of the instant disclosure may discover a virtualization platform from which application information can be obtained, build an application model (e.g., by grouping resources of an application) based on the application information, and discover a firewall product to obtain groups of firewall policies. Such systems may correlate the firewall policies with the application model to build a relationship matrix, use the relationship matrix to implement the firewall policies within the application, and then automatically enforce the firewall policies. In this manner, systems and methods presented herein may efficiently provide a high level of security by enabling micro-segmentation for data center applications without manual intervention.

The following will provide, with reference to FIGS. 1-2 and 4-7, detailed descriptions of exemplary systems for automatically applying firewall policies within data center applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for automatically applying firewall policies within data center applications. As illustrated in this figure, exemplary system 100 may include one or more modules 102 for performing one or more tasks. For example, and as will be explained in greater detail below, exemplary system 100 may include an identification module 104 that may identify a data center application whose functionality may be provided by a set of systems. Exemplary system 100 may additionally include an organization module 106 that may organize, automatically by the computing device, the set of systems into one or more application model groups. Organization module 106 may organize the systems by, for each system in the set of systems, identifying an attribute of the system that may be indicative of a security context under which the system should operate and assigning the system to an application model group for which the security context will be provided. Exemplary system 100 may also include a security module 108 that may, protect each application model group by selecting a firewall configuration that, when applied, will provide the security context for the application model group.

Security module 108 may also use the selected firewall configuration to protect the application model group. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing system 810 in FIG. 8, and/or portions of exemplary network architecture 900 in FIG. 9. One or more of modules 102 in FIG. 1 may also represent all or portions of one or more special-purpose computers configured to perform one or more tasks.

Figure 2:
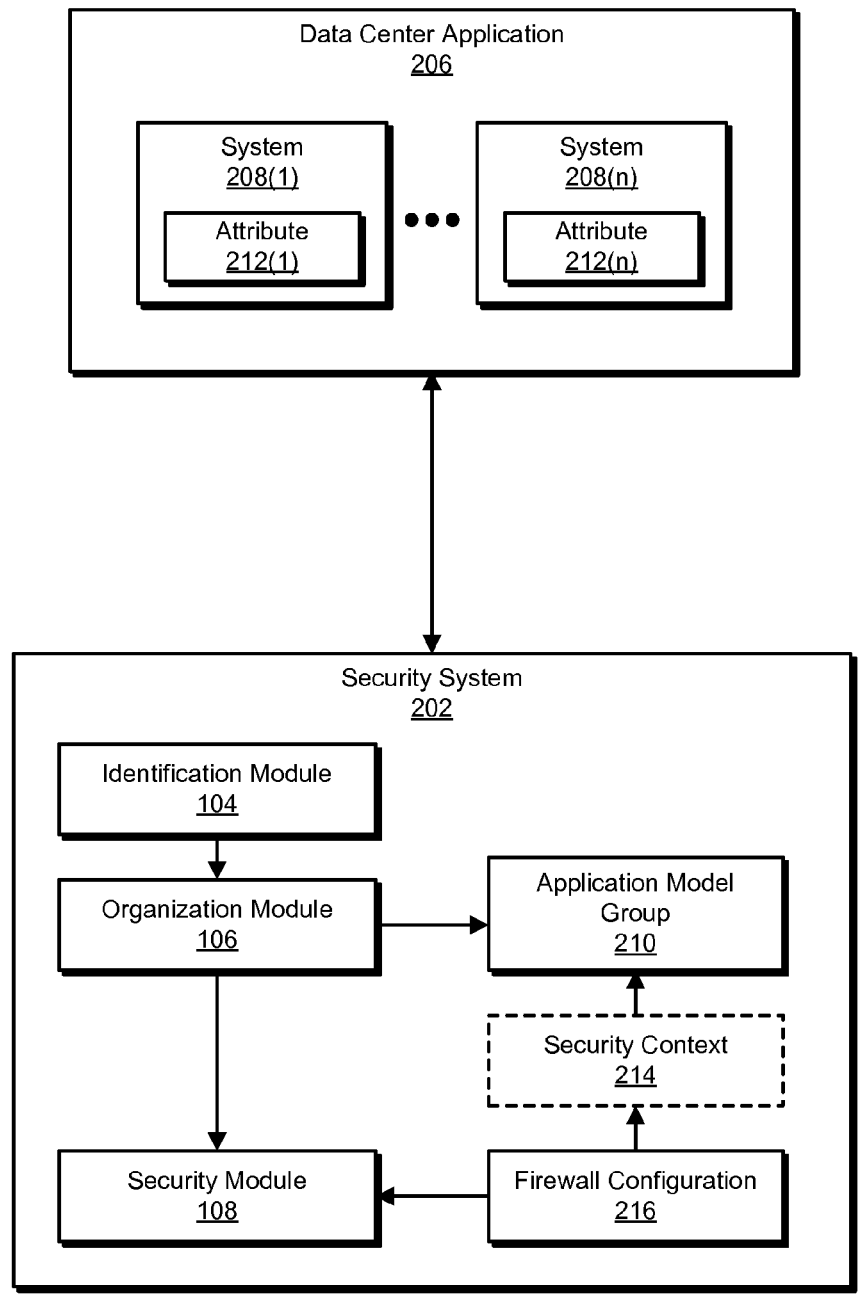
FIG. 2 is a block diagram of an additional exemplary system for automatically applying firewall policies within data center applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include a security system 202 in communication with a data center application 206. In one example, security system 202 may be programmed with one or more of modules 102. Additionally or alternatively, data center application 206 may be programmed with one or more of modules 102. In some embodiments, security system 202 may include or interface with a firewall that protects systems within data center application 206. In one embodiment, data center application 206 may be hosted on a software-defined data center on one or more remote servers.

In one embodiment, one or more of modules 102 from FIG. 1 may, when executed by at least one processor of security system 202 and/or data center application 206, enable security system 202 and/or data center application 206 to automatically apply firewall policies within data center applications. For example, and as will be described in greater detail below, identification module 104 may identify data center application 206 whose functionality is provided by a set of systems 208(1) through 208(n). Next, organization module 106 may organize, automatically by security system 202, the set of systems 208(1) through 208(n) into one or more application model groups by, for each system 208, identifying an attribute 212 of system 208 that is indicative of a security context 214 under which system 208 should operate and assigning system 208 to an application model group 210 for which security context 214 will be provided. Finally, security module 108 may, for each application model group 210 in the one or more application model groups, protect application model group 210 by selecting a firewall configuration 216 that, when applied, will provide security context 214 for application model group 210. Security module 108 may also use the selected firewall configuration 216 to protect application model group 210.

Security system 202 generally represents any type or form of security system capable of applying firewall configurations and/or policies to systems. Examples of security system 202 include, without limitation, firewall products, VMWARE NSX, SYMANTEC DATA CENTER SECURITY, PALO ALTO NETWORKS PA-7050, or any other suitable security system.

Data center application 206 generally represents any type or form of application that is hosted by a data center. The term "data center," as used herein, may refer to any collection of computing systems, real or virtual. For example, a data center may include a software-defined data center composed of virtual machines and/or a virtual network. In some embodiments, a data center application may be implemented within a software-defined network (e.g., a network where a network control plane may be implemented in software and decoupled from an underlying data plane). Examples of data center application 206 include, without limitation, web sites, web services, social networking platforms, e-commerce sites, messaging services, file-sharing platforms, and/or any other type of Internet-connected application.

The term "automatically," as used herein, generally refers to any process performed with limited or no user intervention. A process or step that is performed automatically may also be performed with limited or no user input, for example, by automatically generating a configuration that would normally be configured by a user. The term automatically may also refer to any sequence of steps that is performed by one or more computing systems and/or is completely computer-controlled. In some examples, a step that is performed automatically may be performed entirely by software.

Figure 3:
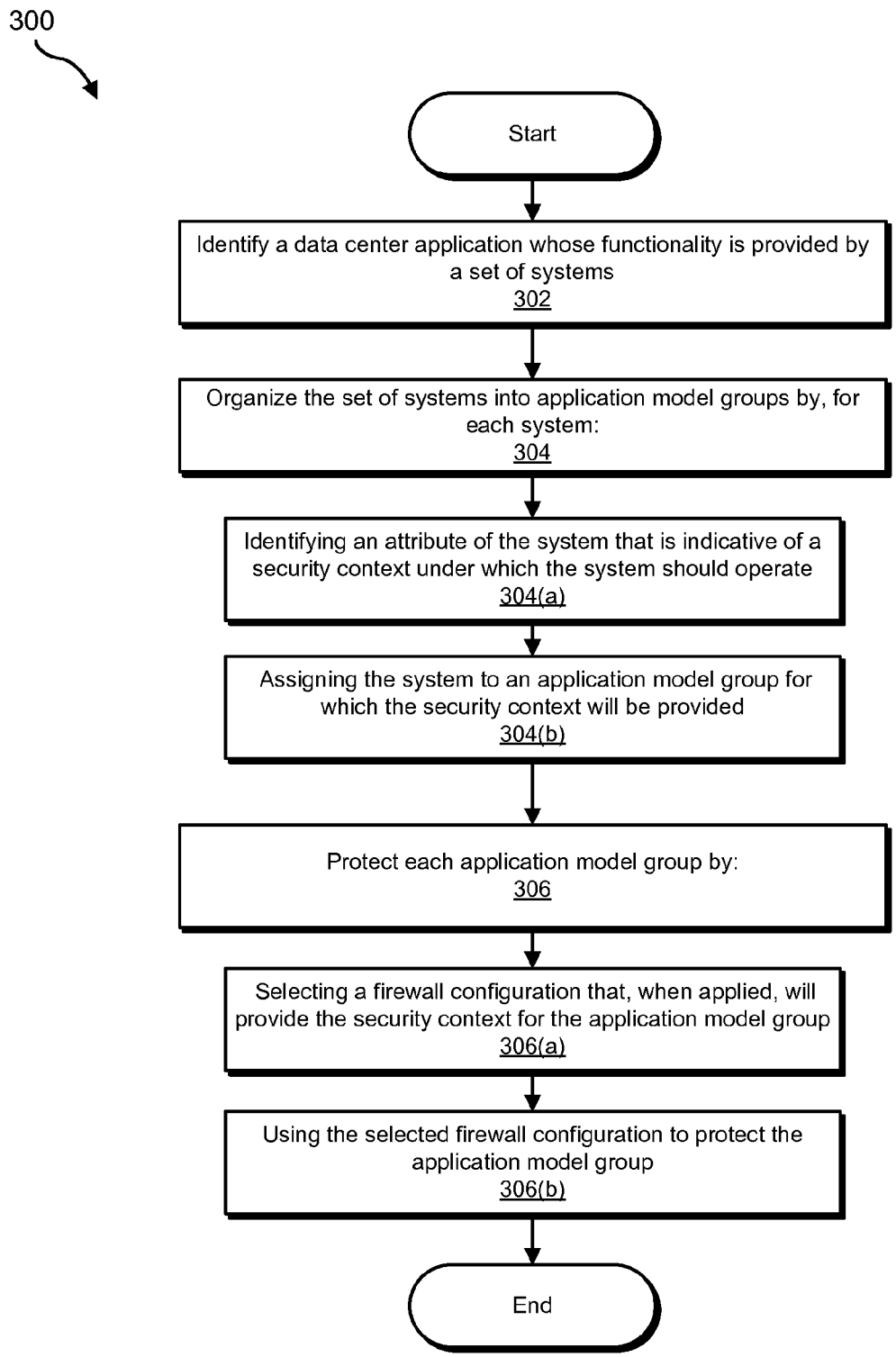
FIG. 3 is a flow diagram of an exemplary method for automatically applying firewall policies within data center applications.

FIG. 3 is a flow diagram of an exemplary computer-implemented method 300 for automatically applying firewall policies within data center applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may identify a data center application whose functionality is provided by a set of systems. For example, identification module 104 may, as part of security system 202 in FIG. 2, identify data center application 206 whose functionality is provided by a set of systems 208(1) to 208(n).

The term "system," as used herein, generally refers to any computing system that may provide any portion of the functionality of a data center application. In some embodiments, a system may include a virtual machine. Additionally or alternatively, a system may include a physical host. In some embodiments, a system may include a communication path, such as the networking components used in a communication.

Identification module 104 may identify the data center application in a variety of ways. For example, identification module 104 may identify the data center application by discovering all of the virtual machines that make up the data center application. In another example, identification module 104 may identify the data center application by identifying the set of systems and determining that they are all part of the same data center application. In some examples, identification module 104 may identify the data center application in response to an automated or manual request to provide security for the data center application. For example, an administrator may run a security system that includes identification module 104 as part of setting up a data center application. In another example, identification module 104 may automatically identify any data center applications provisioned within a software-defined data center. In some examples, a security system that includes identification module 104 may be installed in a data center that includes an existing data center application.

Identification module 104 may identify the data center application in a variety of contexts. For example, identification module 104 may identify the data center application by being part of a firewall product installed to protect the data center application. In this example, the firewall product may discover the systems in the data center application when the firewall is configured and/or while monitoring traffic between systems. In another embodiment, identification module 104 may identify the data center application by being part of a security system that protects virtual machines in the data center. In this example, the security system may identify the data center application automatically by discovering systems within the data center application in response to a request to provide security for the data center application.

At step 304, one or more of the systems described herein may organize, automatically by the computing device, the set of systems into one or more application model groups. For example, organization module 106 may, as part of security system 202 in FIG. 2, organize, automatically by security system 202, the set of systems into one or more application model groups.

The term "application model group," as used herein, generally refers to any collection of systems that form part of a data center application. In some embodiments, an application model group may be a collection of virtual machines that play a similar role in a data center application. For example, an application model group may include all of the virtual machines that provide the web tier of a data center application. In some examples, an application model group may include only one system. In one example, an application model group may include an address group of virtual machines.

Organization module 106 may organize the set of systems in a variety of ways. For example, organization module 106 may organize the set of systems based on application tier. In another example, organization module 106 may organize the set of systems based on which other systems each system communicates with. For example, organization module 106 may organize systems based on incoming dependencies (i.e., the other systems that send traffic to the system as part of the data center application) and/or outgoing dependencies (i.e., the other systems that receive traffic from the system as part of the data center application). Additionally or alternatively, organization module 106 may organize the set of systems based on other criteria, such as whether they provide functionality for an authenticated or an unauthenticated portion of a web site. In some examples, organization module 106 may organize the systems by functionality, for example, by placing all of the application servers running JBOSS into the same application model group. In another example, organization module 106 may place all systems that host databases that store sensitive information into the same application model group.

In some embodiments, organization module 106 may automatically organize the set of systems by organizing the systems based on preconfigured rules. For example, organization module 106 may be configured to automatically organize the systems based on tier and then organize the systems within each tier based on incoming and outgoing dependencies. In another example, organization module 106 may be configured to organize the systems into application model groups based on application tags applied to the systems, where each application model group is made up of systems that all have the same application tag. Additionally or alternatively, organization module 106 may automatically organize systems into application model groups by matching the attributes of each system against a list of attributes associated with each application model group. For example, an application model group may be made up of systems in the database tier that have very limited outgoing traffic. In this example, organization module 106 may automatically place all database servers with limited outgoing dependencies in that application model group. In some embodiments, organization module 106 may organize systems without any manual intervention.

At step 304(*a*), the systems described herein may, for each system in the set of systems, identify an attribute of the system that is indicative of a security context under which the system should operate. For example, organization module 106 may, for each system 208 in the set of systems, identify attribute 212 of system 208 that is indicative of security context 214 under which system 208 should operate.

The term "attribute," as used herein, generally refers to any characteristic of a system within a data center application. Examples of attributes may include, without limitation, an operating system installed on the system, a type of the system, an application installed on the system, a configuration of the system, a configuration of an application installed on the system, a characteristic of network traffic to or from a system, a tag applied to a system, a service provided by a system, the type of data stored on the system, and/or a relationship of the system to other systems within the data center application. For example, a system might have the attributes of running the WINDOWS SERVER 2008 operating system, being a virtual machine configured to mimic a server, hosting a database application that is configured to be read-only, receiving traffic from a web server, and being tagged as "low_security_database."

The term "security context," as used herein, generally refers to any classification of the security needs and/or security configuration of a system. In some embodiments, a security context may include the types, sources, and/or destinations of network traffic that may be directed at or originate from a system. Additionally or alternatively, a security context may include a system's relationship to other systems, such as the application tier occupied by a system. In some examples, a security context could refer to dependencies between systems, the type of data stored on a system, the services provided by a system (i.e., the functions performed by the system on behalf of other systems), the configuration of a system, and/or any other attribute of a system. For example, a public-facing web server that hosts the unauthenticated portion of a web site may have a security context that allows for a wide variety of traffic from many different sources. In another example, a server that hosts a database that stores personally identifying information for employees and/or customers may have a highly sensitive security context. Additionally or alternatively, a system that stores administration settings for a web application may have a security context that disallows traffic from external sources.

In one embodiment, identification module 104 may identify the data center application by querying a data center platform to identify the set of systems that may include the data center application. A data center platform may include software designed to support virtual networks and/or manage data center applications, such as VMWARE NSX. The data center platform may have access to metadata about and/or a model of the data center application and/or systems within the data center application that identification module 104 may use to identify attributes of systems within the data center application. In this embodiment, identification module 104 may identify the attribute of the system by querying the data center platform to determine an application tier that the system belongs to within the data center application and/or a service running on the system. In some embodiments, identification module 104 may also query the data center application about traffic to or from the system to determine an inbound dependency of the system and/or an outbound dependency of the system. For example, identification module 104 may determine that a system belongs to the web tier, the application tier, and/or the database tier of the data center application. In another example, identification module 104 may determine that the system is configured as and/or is hosting a web server, an email server, a database server, and/or a file server. Additionally or alternatively, identification module 104 may determine that the system sends traffic to a certain other system and/or receives traffic from a certain other system. For example, identification module 104 may query the data center platform and determine that an application server receives traffic from a web server and sends traffic to a database server.

In some embodiments, identification module 104 may categorize systems into categories and/or sub-categories based on the tier and/or services running on the system. For example, identification module 104 may categorize a system as belonging to the "business" category, the "database" sub-category, the "client-server" technology category, and/or the "MONGODB" application category. In some examples, identification module 104 may also categorize systems based on which ports are open (e.g., to receive requests from other systems) and/or which protocols are being used by the system to receive requests. In some embodiments, identification module 104 may determine the above information based on metadata from the system. The term "metadata," as used herein, typically refers to any description of and/or data about a system or characteristic of a system. For example, metadata about a system may include the types of applications the system is configured with, the types of traffic the system is expecting, and/or the operating system on a system. In some examples, identification module 104 may categorize systems according to SHAREPOINT application type, such as document, library, web application and/or application programming interface.

At step 304(b), the systems described herein may assign the system to an application model group for which the security context will be provided. For example, organization module 106 may, as part of security system 202 in FIG. 2, assign system 208 to application model group 210 for which security context 214 will be provided. Organization module 106 may organize the systems into application model groups in a variety of ways.

In some examples, organization module 106 may organize the systems into one or more application model groups by determining, based on application tiers, services, and dependencies of the set of systems of the data center application, how many application model groups the systems will be organized into and/or the security contexts that should be provided for each of the application model groups. For example, organization module 106 may determine that the data center application includes three tiers and may therefore organize the systems into three application model groups. In another example, organization module 106 may determine that the data center application includes five clusters of systems that all primarily communicate internally within each cluster and may therefore organize the systems into five application model groups. In this example, organization module 106 may also determine that the security context for each cluster should limit communications to systems outside the cluster. Additionally or alternatively, organization module 106 may assign application model groups based on manually created groupings. In some examples, organization module 106 may create VMWARE NSX application model groups and/or address groups based on categories and/or sub-categories of systems identified by identification module 104. The term "address group," as used herein, refers to a group of network addresses of systems organized by application model group.

Figure 4:
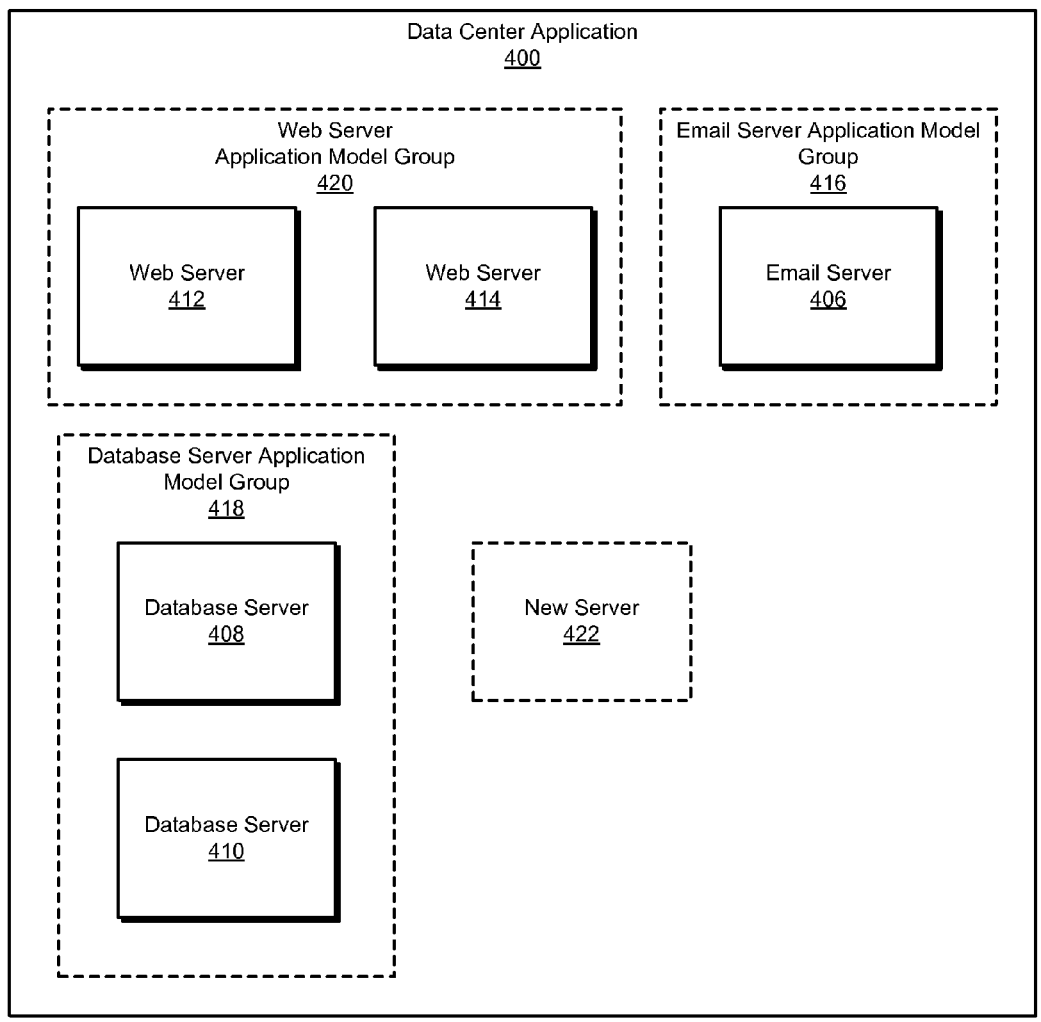
FIG. 4 is a block diagram of an exemplary computing system for automatically applying firewall policies within data center applications.

In some embodiments, security contexts and/or application model groups may be created and/or organized based on application tier. As illustrated in FIG. 4, data center application 400 may include a web server application model group 420 that includes a web server 412 and/or a web server 414, an email server application model group 416 that may include an email server 406, and/or a database server application model group 418 that may include database servers 408 and 410.

In some examples, identification module 104 may determine that a new system has been added to the data center application, and, in response to determining that the new system has been added, organization module 106 may identify an attribute of the new system that is indicative of a security context under which the new system should operate and assign the system to an existing application model group for which the security context will be provided. For example, if a new server 422 is added to the data center application, identification module 104 may examine attributes of new server 422 to determine whether new server 422 is a web server, a database server, or an email server and therefore whether to add new server 422 to web server application model group 420, email server application model group 416, or database server application model group 418. In some examples, new server 422 may be another type of server, such as an application server, and organization module 106 may create a new application model group. In some embodiments, organization module 106 may consider application servers part of the same tier as email servers and may place new server 422 in email server application model group 416.

In some examples, organization module 106 may reevaluate the entire data center application model and/or re-organize the existing application model groups when new server 422 is added. For example, organization module 106 may remove email server application model group 416 and create an application server application model group. Organization module 106 may also reorganize systems and/or application model groups based on relationships between systems in the application model group and new server 422. For example, web server 412 may need to communicate with new server 422 while web server 414 may not need to communicate with new server 422. In this example, organization module 106 may place web server 412 and web server 414 into different application model groups that have different security contexts in relation to new server 422.

In some embodiments, organization module 106 may also reorganize systems and/or application model groups if a system is deleted or modified. For example, if a server is modified to communicate with a different set of servers than previously, organization module 106 may place the server into a different application model group that allows the server to communicate with the new set of servers.

Returning to FIG. 3, at step 306, one or more of the systems described herein may, for each application model group in the one or more application model groups, protect the application model group. For example, security module 108 may, as part of security system 202 in FIG. 2, for each application model group 210 in the one or more application model groups, protect application model group 210.

Security module 108 may protect the application model groups in a variety of contexts. For example, security module 108 may be part of a firewall product with firewall policies that protect the application model group. In some examples, security module 108 may include a next-generation firewall product and/or a point firewall product. In another embodiment, security module 108 may be part of a security system that communicates with a firewall product to protect the application model group.

At step 306(a), one or more of the systems described herein may select a firewall configuration that, when applied, will provide the security context for the application model group. For example, security module 108 may, as part of security system 202 in FIG. 2, select firewall configuration 216 that, when applied, will provide security context 214 for application model group 210.

The term "firewall configuration," as used herein, generally refers to any way in which a firewall may protect a system. A firewall configuration may include firewall settings, firewall policies, types of firewalls, any other suitable characteristic of a firewall, and/or any combination of the above.

In some embodiments, security module 108 may select an automatically generated firewall configuration. For example, security module 108 may automatically combine several firewall policies and/or settings into a firewall configuration based on the security context of an application model group. In some examples, security module 108 may select a firewall configuration based on a correlation algorithm that maps application tags to security tags. The correlation algorithm may map security tags (e.g., tags assigned to application model groups) to application tags (e.g., tags assigned to systems of a data center application) based on descriptions of the tags. For example, security module 108 may map the application tag "mission_critical" to the security tag "SHAREPOINT strict policy" based on a description of the "mission_critical" tag as applying to systems with highly sensitive security contexts and a description of the "SHAREPOINT strict policy" as being the most strict security policy. In other examples, security module 108 may use a mapping inputted by a user. For example, a user may provide a mapping that correlates the application tag "mission_critical" to the security tag "SHAREPOINT strict policy."

Security module 108 may select a predefined or default firewall configuration. For example, an administrator may provide a set of manually created firewall configurations that match the expected security contexts of the systems within the data center application, and security module 108 may select one of these configurations. In some embodiments, security module 108 may select a mix of automatically generated and preconfigured firewall configurations.

In some examples, security module 108 may identify each application model group in which the systems of the data center application are organized and create a firewall configuration for each identified application model group by establishing a set of firewall policies that, when enforced, will provide the security context for each identified application model group. In one example, security module 108 may create a firewall configuration by combining several firewall policies. For example, security module 108 may combine the firewall policies "allow only hypertext transfer protocol secure (HTTPS) traffic" and "allow only requests from internal Internet protocol addresses" to create a firewall configuration to protect a group of internal web servers.

Figure 5:
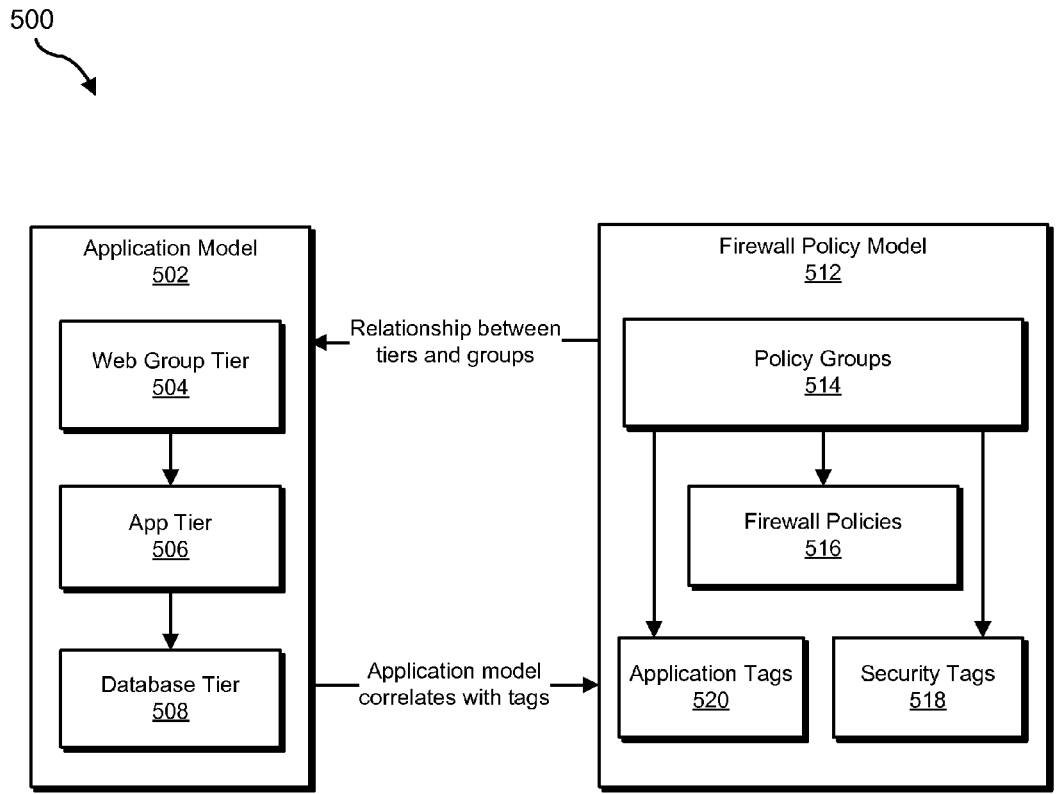
FIG. 5 is a block diagram of an exemplary computing system for automatically applying firewall policies within data center applications.

Security module 108 may correlate firewall configurations to application model groups in a variety of ways. For example, as illustrated in FIG. 5, security module 108 may correlate an application model 502 to a firewall policy model 512. In one example, application model 502 may include a web tier 504, an app tier 506, and/or a database tier 508. The systems in application model 502 may be tagged according to various characteristics, such as the application tier that includes the system. Firewall policy model 512 may correlate application tags 520 with security tags 518 that are derived from policy groups 514 in order to apply firewall policies 516 to the appropriate application model groups. In some examples, policy groups 514 may correlate to the application model groups in application model 502.

Figure 6:
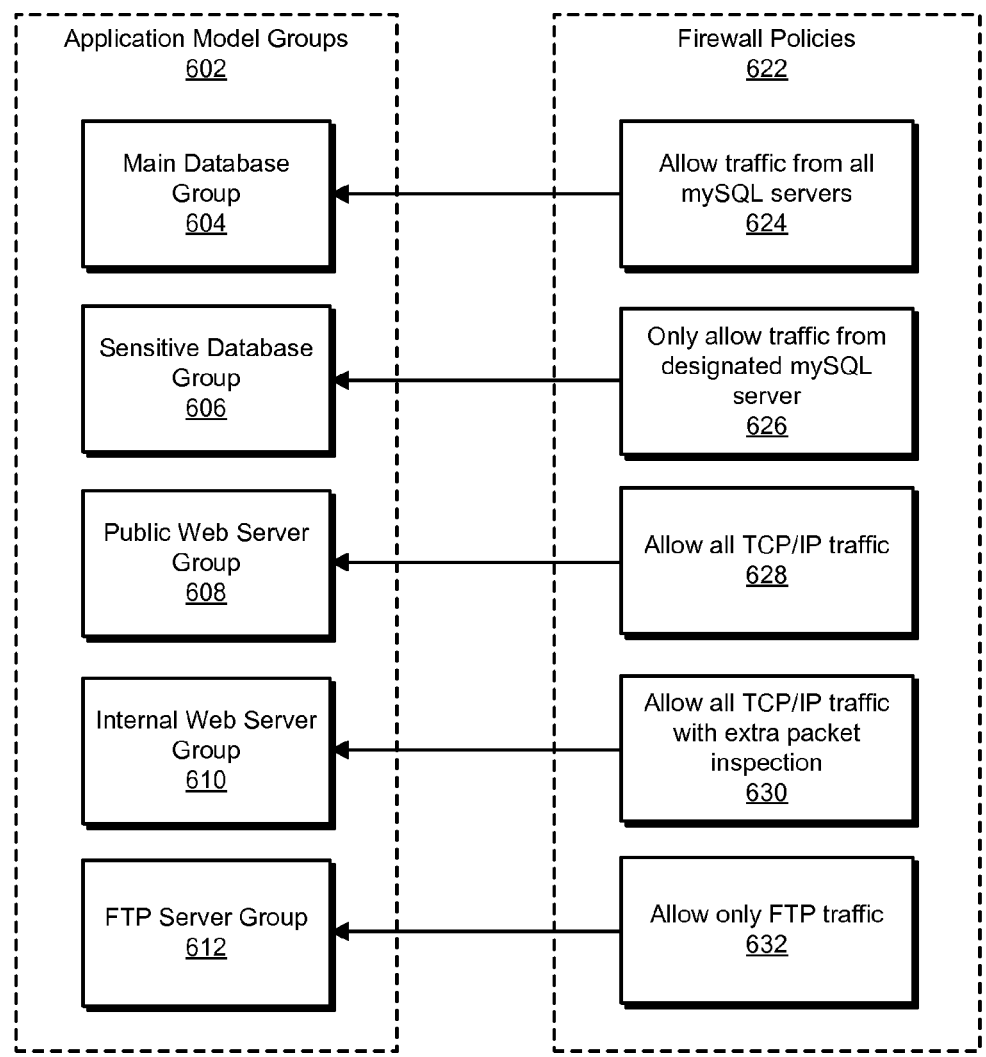
FIG. 6 is a block diagram of an exemplary computing system for automatically applying firewall policies within data center applications.

In some examples, security module 108 may correlate specific firewall policies to each application model group. For example, as illustrated in FIG. 6, security module 108 may correlate firewall policies 622 to application model groups 602. In some examples, systems in the same tier may be divided into different application model groups. For example, a firewall policy "allow traffic from all MySQL servers" 624 may correlate to a main database group 604 while a firewall policy "only allow traffic from designated MySQL server" 626 may correlate to a sensitive database group 606. In another example, a firewall policy "allow all transmission control protocol over Internet protocol (TCP/IP) traffic" 628 may apply to a public web server group 608 while a firewall policy "allow all TCP/IP traffic with extra packet inspection" 630 may apply to an internal web server group 610. In some examples, a firewall policy may correlate to an application model group that includes systems that perform a specific function. For example, a firewall policy "allow only file transfer protocol (FTP) traffic" 632 may correlate to an FTP server group 612.

In some examples, security module 108 may identify a set of firewall configurations by identifying metadata of each firewall configuration and may choose the firewall configuration that corresponds to the security context for the application model group by correlating the metadata of each firewall configuration with one or more application model groups. For example, security module 108 may identify security tags that describe each firewall configuration and/or may correlate the security tags to application model groups. In some embodiments, the firewall policies listed above in connection with FIG. 6, such as "only allow FTP traffic" 632, may be examples of security tags. Additionally or alternatively, security module 108 may correlate application model groups to user-defined security policies and/or security tags.

Returning to FIG. 3, at step 306(b), one or more of the systems described herein may use the selected firewall configuration to protect the application model group. For example, security module 108 may, as part of security system 202 in FIG. 2, use the selected firewall configuration 216 to protect application model group 210.

In some examples, security module 108 may select the firewall configuration by identifying a set of firewall configurations. In these examples, each firewall configuration within the set of firewall configurations may include a different set of firewall policies. Security module 108 may then choose the firewall configuration that corresponds to the security context for the application model group. In some examples, security module 108 may choose the firewall configuration based on application tags applied to the systems in the application model group and/or security tags applied to the firewall policies. In this embodiment, security module 108 may use the selected firewall configuration to protect the application model group by configuring a firewall with the firewall configuration and activating the firewall such that the firewall protects the application model group. For example, the firewall may monitor, intercept, and/or inspect packets directed at systems within the application model group in accordance with the firewall configuration.

Figure 7:
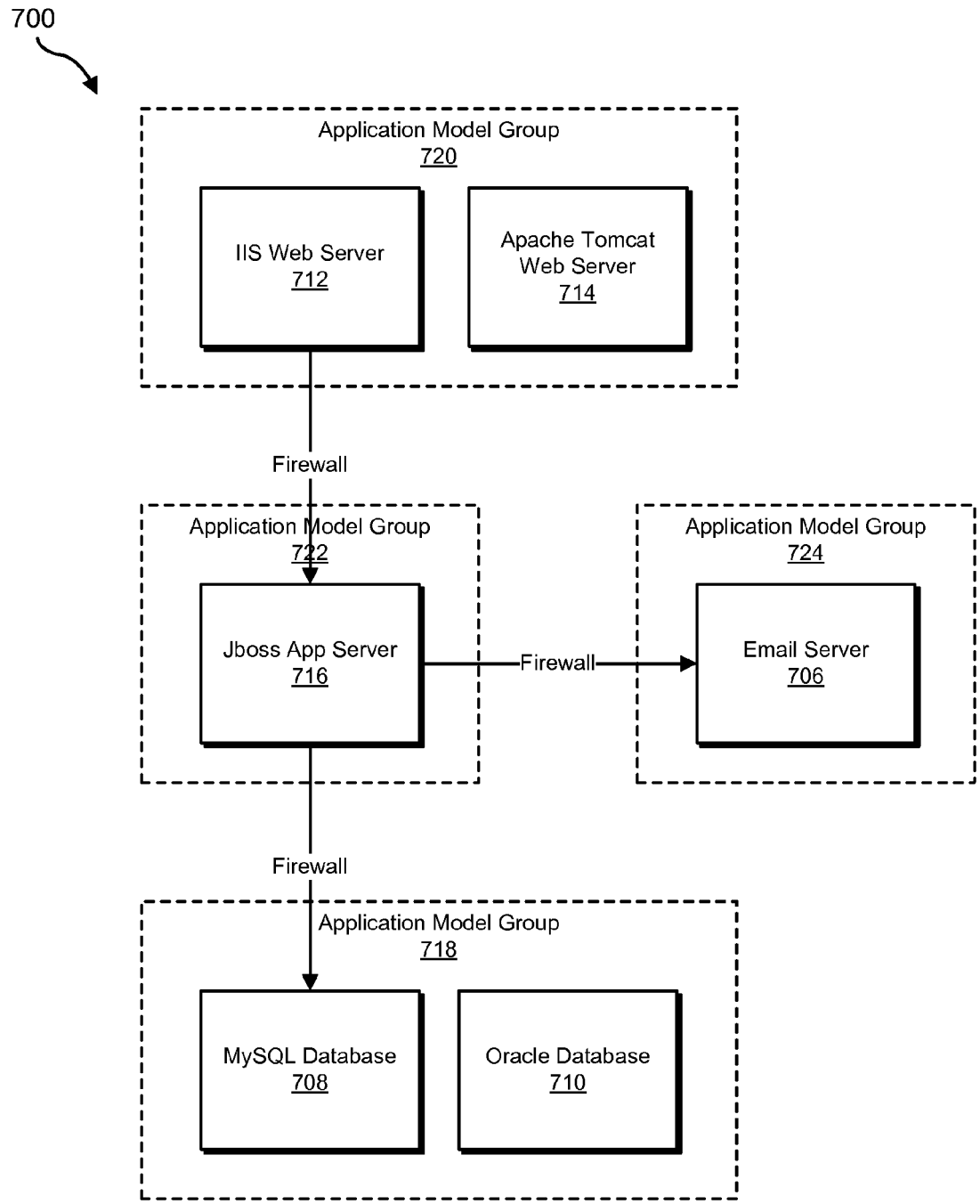
FIG. 7 is a block diagram of an exemplary computing system for automatically applying firewall policies within data center applications.

In some examples, organization module 106 may organize the selected firewall configuration to protect the application model group by providing security micro-segmentation and security module 108 may enforce one or more policies of the selected firewall configuration on communications between the application model group and at least one other application model group of the data center application. The term "security micro-segmentation," as used herein, may refer to any blocking, monitoring, or otherwise controlling network traffic in between systems within the same network. For example, as illustrated in FIG. 7, a data center application may include four application model groups, application model groups 718, 720, 722, and/or 724. Each of these application model groups may include one or more systems, such as IIS web server 712, APACHE TOMCAT web server 714, JBOSS app server 716, email server 706, MySQL database 708 and/or ORACLE database 710. In some examples, security module 108 may enforce firewall policies on communications between systems in application model group 720 and application model group 722, between application model group 722 and application model group 724, and/or between application model group 722 and application model group 718.

By enforcing firewall policies on communications between groups, security module 108 may prevent malicious activity that has infected one application model group from infecting others. For example, a virus may infect JBOSS app server 716 due to a previously undiscovered vulnerability. In this example, the virus may try to spread to ORACLE database 710 in order to steal sensitive data. The firewall policy may prevent the virus from spreading by inspecting packets passing from JBOSS app server 716 in application model group 722 and ORACLE database 710 in application model group 718 and blocking the suspicious traffic generated by the virus.

In one embodiment, the system may include a virtual machine, the firewall configuration may be implemented within a virtual firewall, and the data center application may be implemented on a software-defined data center platform. The term "virtual firewall," as used herein, typically refers to any application that runs entirely within a virtual network and monitors, filters, controls, and/or otherwise interacts with network traffic. Unlike a hardware firewall, a virtual firewall may monitor packets passing between virtual machines operating on the same physical device. In this embodiment, organization module 106 may organize the set of systems into the one or more application model groups by instructing the software-defined data center platform to use a data structure of the software-defined data center platform to divide the set of systems into the one or more application model groups. For example, the data center application may be a web site implemented on a software-defined data center with micro-segmentation security enforced by SYMANTEC DATA CENTER SECURITY.

As described in connection with method 300 above, the systems and methods described herein may protect systems within a data center application by automatically applying firewall policies to automatically defined application model groups of systems within the data center application. These firewall policies may control East-West traffic within the network that hosts the data center application. First, the systems described herein may discover all of the virtual machines within a data center application and/or determine the function of each virtual machine. Next, the systems described herein may group the virtual machines by functionality, for example by putting all web servers configured with IIS in one group and all application servers configured with JBOSS in another. The systems described herein may also discover dependencies between virtual machines (for example, that the application server processes incoming requests from the web server and makes outgoing requests to the database server). The systems described herein may create firewall policy groups in the firewall product that correspond to the application model groups and/or may configure firewall policies for each application model group. If a new virtual machine is added and/or other changes are made to the data center application, the systems described herein may reorganize the application model groups and/or firewall policies. By enforcing micro-segmentation on data center applications, the systems described herein may prevent attacks that infect one part of the data center application from infecting others. By grouping virtual machines and configuring firewall policies automatically, the systems described herein may also efficiently maintain high levels of security for data center applications without time-consuming and error-prone human intervention.

Figure 8:
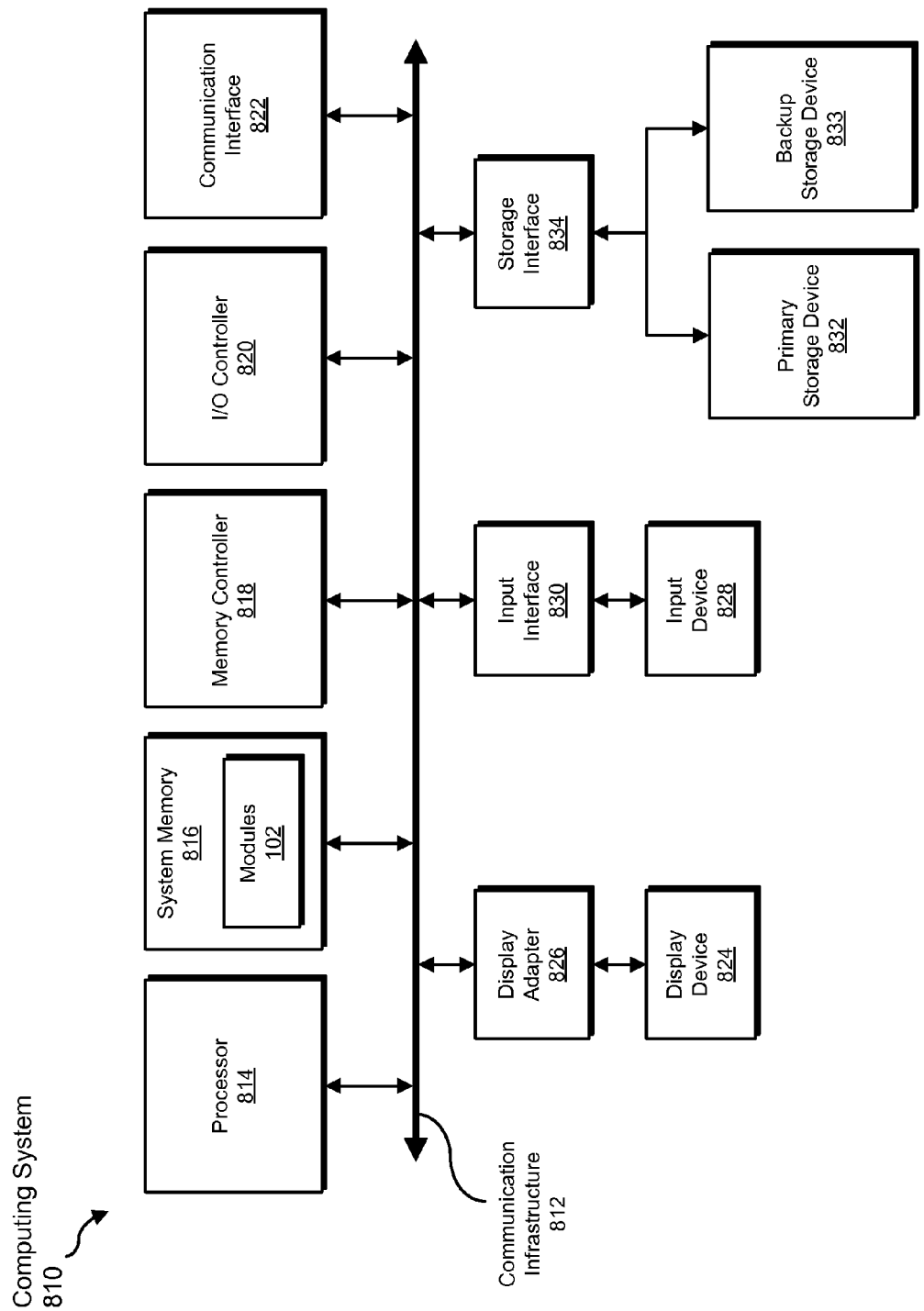
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for automatically applying firewall policies within data center applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data center application information to be transformed, transform the data center application information, output a result of the transformation to a data center application model, use the result of the transformation to organize the data center application into application model groups, and store the result of the transformation to a security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically applying firewall policies within data center applications, at least a portion of the method being performed by a computing device comprising at least one processor, the method comprising:
   identifying a data center application whose functionality is provided by a set of systems;
   organizing, automatically by the computing device, the set of systems into one or more application model groups that each comprise a group of applications with a same security context by, for each system in the set of systems:
      identifying an attribute of the system within the set of systems that is indicative of a security context under which the system should operate;
      assigning the system to an application model group for which the security context will be provided;
   for each application model group in the one or more application model groups, protecting the application model group by:
      selecting a firewall configuration that, when applied, will provide the security context for the application model group based at least in part on correlating metadata about the firewall configuration with the application model group;
      using the selected firewall configuration to protect the application model group.

2. The computer-implemented method of claim 1, wherein:
   identifying the data center application comprises querying a data center platform to identify the set of systems that comprise the data center application;
   identifying the attribute of the system comprises querying the data center application to determine at least one of:
      an application tier that the system belongs to within the data center application;
      a service running on the system;
      an inbound dependency of the system;
      an outbound dependency of the system.

3. The computer-implemented method of claim 2, wherein organizing the systems into one or more application model groups comprises:
   determining, based on application tiers, services, and dependencies of the set of systems of the data center application, at least one of:
      how many application model groups the systems will be organized into;
      the security contexts that should be provided for each of the application model groups.

4. The computer-implemented method of claim 1, wherein:
   selecting the firewall configuration comprises:
      identifying a set of firewall configurations, wherein each firewall configuration within the set of firewall configurations comprises a different set of firewall policies;
      choosing the firewall configuration that corresponds to the security context for the application model group;
      using the selected firewall configuration to protect the application model group comprises:
         configuring a firewall with the firewall configuration;
         activating the firewall such that the firewall protects the application model group.

5. The computer-implemented method of claim 4, wherein identifying the set of firewall configurations comprises:
   identifying each application model group in which the systems of the data center application are organized;
   creating a firewall configuration for each identified application model group by establishing a set of firewall policies that, when enforced, will provide the security context for each identified application model group.

6. The computer-implemented method of claim 4, wherein
   identifying a set of firewall configurations comprises identifying the metadata of each firewall configuration in the set of firewall configurations.

7. The computer-implemented method of claim 1, wherein using the selected firewall configuration to protect the application model group comprises providing security micro-segmentation by enforcing one or more policies of the selected firewall configuration on communications between the application model group and at least one other application model group of the data center application.

8. The computer-implemented method of claim 1, further comprising:
   determining that a new system has been added to the data center application;
   in response to determining that the new system has been added to the data center application:
      identifying an attribute of the new system that is indicative of a security context under which the new system should operate;
      assigning the system to an existing application model group for which the security context will be provided.

9. The computer-implemented method of claim 1, wherein:
   the system comprises a virtual machine;
   the firewall configuration is implemented within a virtual firewall;
   the data center application is implemented on a software-defined data center platform;
   organizing the set of systems into the one or more application model groups comprises instructing the software-defined data center platform to use a data structure of the software-defined data center platform to divide the set of systems into the one or more application model groups.

10. A system for automatically applying firewall policies within data center applications, the system comprising:
    at least one hardware memory;
    an identification module, stored in the hardware memory, that identifies a data center application whose functionality is provided by a set of systems;
    an organization module, stored in the hardware memory, that organizes, automatically by a computing device, the set of systems into one or more application model groups that each comprise a group of applications with a same security context by, for each system in the set of systems:
       identifying an attribute of the system within the set of systems that is indicative of a security context under which the system should operate;

assigning the system to an application model group for which the security context will be provided;
a security module, stored in the hardware memory, that, for each application model group in the one or more application model groups, protects the application model group by:
selecting a firewall configuration that, when applied, will provide the security context for the application model group based at least in part on correlating metadata about the firewall configuration with the application model group;
using the selected firewall configuration to protect the application model group;
at least one physical processor configured to execute the identification module, the organization module, and the security module.

11. The system of claim 10, wherein:
the identification module identifies the data center application by querying a data center platform to identify the set of systems that comprise the data center application;
the organization module identifies the attribute of the system by querying the data center application to determine at least one of:
an application tier that the system belongs to within the data center application;
a service running on the system;
an inbound dependency of the system;
an outbound dependency of the system.

12. The system of claim 11, wherein the organization module organizes the systems into one or more application model groups by:
determining, based on application tiers, services, and dependencies of the set of systems of the data center application, at least one of:
how many application model groups the systems will be organized into;
the security contexts that should be provided for each of the application model groups.

13. The system of claim 10, wherein:
the security module selects the firewall configuration by:
identifying a set of firewall configurations, wherein each firewall configuration within the set of firewall configurations comprises a different set of firewall policies;
choosing the firewall configuration that corresponds to the security context for the application model group;
the security module uses the selected firewall configuration to protect the application model group by:
configuring a firewall with the firewall configuration;
activating the firewall such that the firewall protects the application model group.

14. The system of claim 13, wherein the security module identifies the set of firewall configurations by:
identifying each application model group in which the systems of the data center application are organized;
creating a firewall configuration for each identified application model group by establishing a set of firewall policies that, when enforced, will provide the security context for each identified application model group.

15. The system of claim 13, wherein
the identification module identifies the set of firewall configurations by identifying the metadata of each firewall configuration in the set of firewall configurations.

16. The system of claim 10, wherein the security module uses the selected firewall configuration to protect the application model group by providing security micro-segmentation by enforcing one or more policies of the selected firewall configuration on communications between the application model group and at least one other application model group of the data center application.

17. The system of claim 10, wherein:
the identification module determines that a new system has been added to the data center application;
in response to determining that the new system has been added to the data center application:
the organization module identifies an attribute of the new system that is indicative of a security context under which the new system should operate;
the organization module assigns the system to an existing application model group for which the security context will be provided.

18. The system of claim 10, wherein:
the system comprises a virtual machine;
the firewall configuration is implemented within a virtual firewall;
the data center application is implemented on a software-defined data center platform;
the organization module organizes the set of systems into the one or more application model groups by instructing the software-defined data center platform to use a data structure of the software-defined data center platform to divide the set of systems into the one or more application model groups.

19. A non-transitory computer-readable medium comprising one or more computer-readable instructions that, when executed by at least one processor of a computing device, cause the computing device to:
identify a data center application whose functionality is provided by a set of systems;
organize, automatically by the computing device, the set of systems into one or more application model groups that each comprise a group of applications with a same security context by, for each system in the set of systems:
identifying an attribute of the system within the set of systems that is indicative of a security context under which the system should operate;
assigning the system to an application model group for which the security context will be provided;
for each application model group in the one or more application model groups, protect the application model group by:
selecting a firewall configuration that, when applied, will provide the security context for the application model group based at least in part on correlating metadata about the firewall configuration with the application model group;
using the selected firewall configuration to protect the application model group.

20. The non-transitory computer-readable medium of claim 19, wherein the one or more computer-readable instructions cause the computing device to:
identify the data center application comprises querying a data center platform to identify the set of systems that comprise the data center application;
identify the attribute of the system comprises querying the data center application to determine at least one of:
an application tier that the system belongs to within the data center application;
a service running on the system;
an inbound dependency of the system;
an outbound dependency of the system.

* * * * *